Nov. 15, 1949  C. F. KRAMER ET AL  2,488,471
BODY COWL CONSTRUCTION
Filed July 26, 1945  2 Sheets-Sheet 1
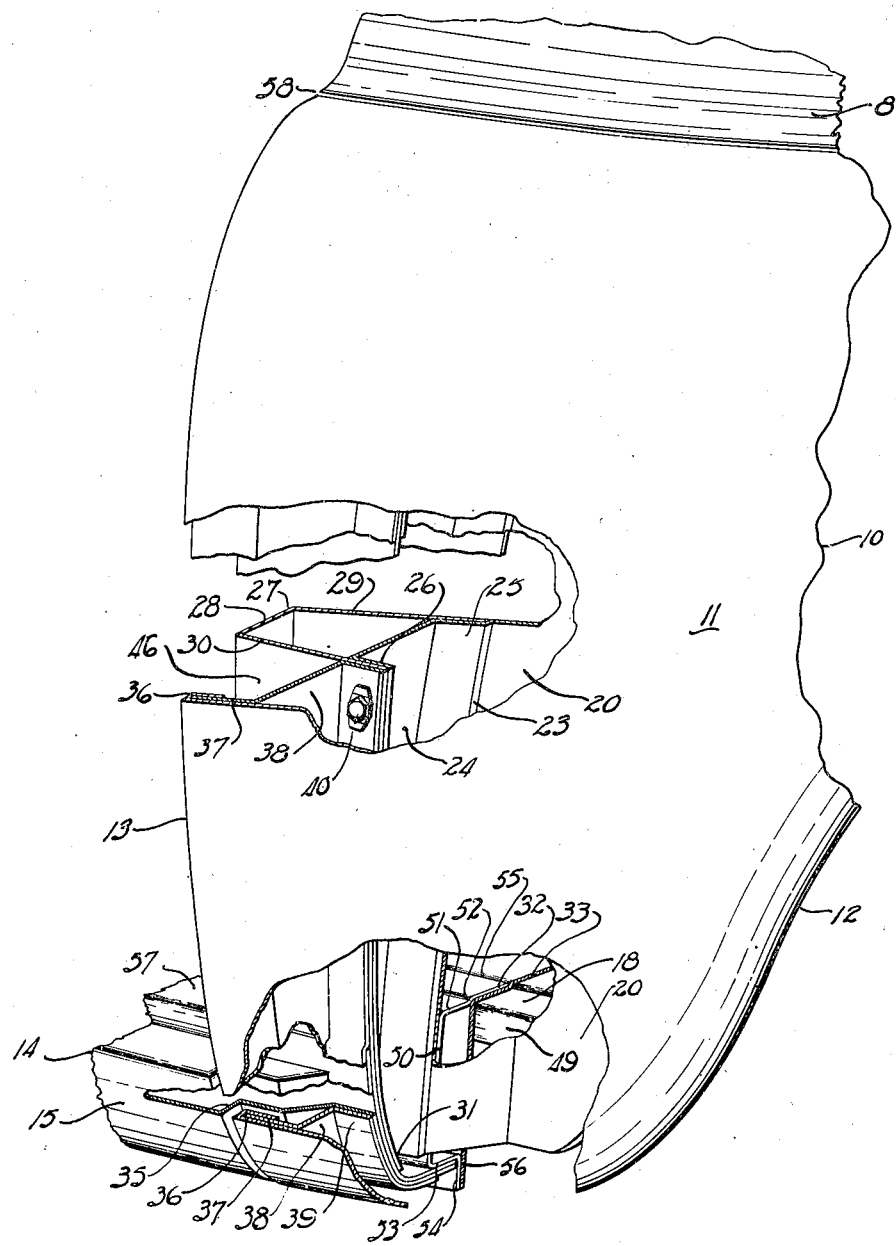
Fig. I
C. F. KRAMER
H. F. CROMWELL
INVENTOR.
BY

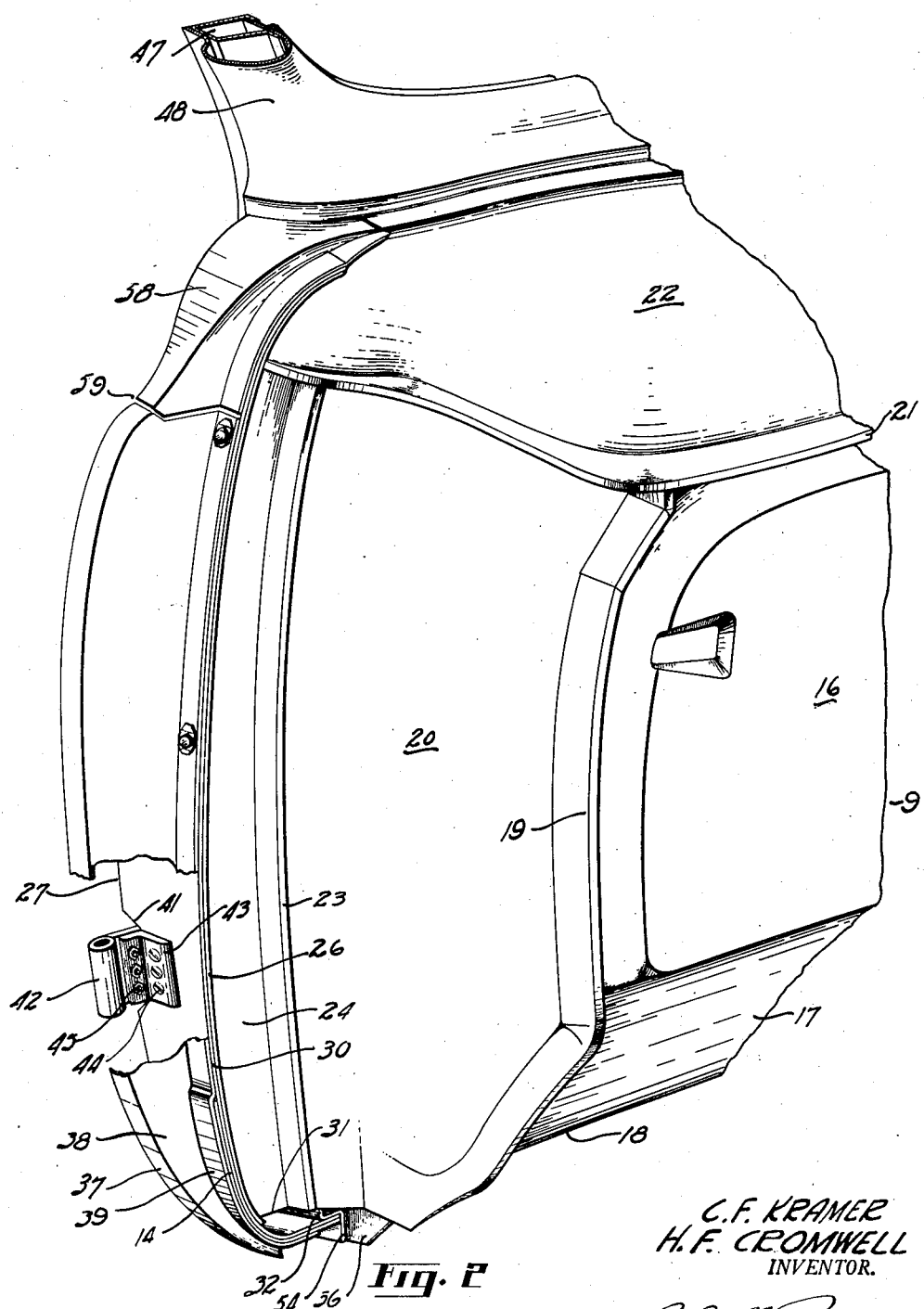

Patented Nov. 15, 1949

2,488,471

UNITED STATES PATENT OFFICE 2,488,471

BODY COWL CONSTRUCTION

Clarence F. Kramer, Birmingham, and Herbert F. Cromwell, Detroit, Mich., assignors to Ford Motor Company, Dearborn, Mich., a corporation of Delaware Application July 26, 1945, Serial No. 608,488

9 Claims. (Cl. 296—28)

This invention relates to the construction of automotive bodies, and, more particularly, to an improved cowl, dash and door pillar construction together with a concealed fender mounting and door hinge.

In the construction of motor vehicle bodies, it has long been the accepted practice to provide a substantially vertical dashboard closing the extreme forward portion of the passenger compartment and separating it from the engine compartment forwardly thereof. This dash terminates at its lower edge in a rearwardly and downwardly sloping toeboard (through which the pedals relied upon for control of the vehicle normally extend) and thence horizontally rearwardly to form the floor proper of the passenger compartment. A cowl is usually secured to the top of the dash panel and extends rearwardly and usually slightly upwardly therefrom until it merges with the windshield mounting. Side cowl panels extend from the cowl and the dash on each side thereof rearwardly and outwardly until they merge with the respective side panels of the body proper. The outer surface of a part of the side cowl panel forms the inner side of the front wheel enclosure and the rear edge of the front fender, as presently constructed, is usually secured to this cowl panel along the line on which the cowl panel becomes part of the body side panel. The side of the cowl serves them partly as the wheel enclosure, in which case it is concealed behind the fender skirt, and partly as a portion of an outer body panel where it extends rearwardly of the fender skirt. This means that there is a joint between the fender skirt and the cowl panel at which leakage is almost certain to occur with attendant deterioration due to rusting. In addition, it is necessary to provide a vertical door pillar at the rearward extremity of the cowl panel. This must be of sufficiently rigid construction to support the door and, at the same time, should be entirely enclosed so far as communiction with the wheel enclosure is concerned. Heretofore, this has been extremely difficult to achieve. While in some cases, it is possible to make a combined cowl, toeboard, dashboard and side assembly in which the component parts are welded or otherwise secured together to approximate an integral forward housing, there has been no practicable means of attaching the front fender to this assembly to prevent leakage, nor has there been a satisfactory pillar construction developed which may be integral with the housing structure and reinforced by it and at that same time be proofed against leakage of dust and water from the wheel enclosure or of engine fumes from the engine compartment—both of which lie immediately forwardly of it.

The advantage of the present construction is that together with having a completely enclosed forward housing for the passenger compartment, this construction is integrated with the body panel proper, the fender mounting and the door pillar, so that there are no visible external joints nor any internal joints in the assembly through which dust, moisture or fumes may leak, causing deterioration of the components or discomfort to the accupants. Another advantage of the construction is that it provides a fully concealed mounting for the fender and yet this mounting is readily accessible for purposes of assembly or when it is necessary to detach the fender for repair or replacement. Still another advantage is that the door pillar is integrally connected with and supported by the entire cowl and dash construction. Yet another advantage is the provision of a clearance chamber for the door's front flange as required in door mountings of the type in which the forward edge of the door pivots inwardly of the outer body line when the door is opened. A further advantage lies in the reinforced floor beam construction, which may be made a part of this construction. And another advantage resides in the improved method of joining the body running board with the cowl, floor and pillar assembly. Yet another advantage is that the fender, per se, is in one piece, independent of the cowl panel, and hence, may easily be restored to shape if damaged.

With this and other considerations in view, the invention consists of the structure described in this specification, claimed in the claims and shown in the accompanying drawings in which:

Figure 1 is a perspective view of a portion of the right-hand side of a motor vehicle generally adjacent to the front door pillar showing the rear part of the right-hand fender and the beginning of the running board structure, a part of the fender and of the dash and pillar panels being broken away to show in more detail the exact constructions used.

Figure 2 is a somewhat similar perspective view with, however, the fender entirely removed and substantially half of the front or cowl housing being shown in relation to the door pillar fender support, and the windshield mounting.

Referring first to Figure 1, 8 indicates a portion of the engine compartment hood and 10 a fender having a depending skirt 11 defining the wheel opening 12 and having a substantially vertical rear edge 13 which, in this case, defines the forward edge of the door opening into the front passenger compartment of the vehicle. The running board or door sill of the vehicle is formed by the rocker panel 14 and it will be understood that, following the usual practice, at least the upper surface of this member is covered by the door of the vehicle when closed, the door having a depending flange more or less conforming to and lying outwardly of the outer curved surface 15 of the rocker panel 14 and extending below its upper surface.

Returning now to Fig. 2, as well, the construction of the front portion of the passenger housing is shown. This comprises front panel 9 including a dashboard 16 arranged substantially vertically and having a toeboard section 17 perfectly formed integrally with the dashboard and extending from it rearwardly and downwardly to the substantially horizontal floor ledge 18 forming the extreme rear portion of this panel with the floor 18 of the front passenger compartment. The upper and side and the lower edges of front panel 9 are flanged forwardly and downwardly, respectively, as shown at 49 and nest in the similarly flanged edges 19 of the cowl side panel 20 and 21 of the cowl roof panel 22 and similar connections are made between the outwardly flanged top edge of the cowl side panel 20 and the side flanges of the cowl roof panel 22. These nested flanges are securely welded together at sufficiently frequent intervals to provide a dust- and moisture-proof joint between the dashboard, toeboard, cowl and side panels; and, indeed, in many instances substantially the entire front housing can be made from a single stamping.

Attention is now directed to the upper broken away section in Figure 1, in which it will be noted that the cowl side panel 20 has an offset 23 spaced slightly forwardly of its rear edge and then is formed to a channel section having a web 24, an inner flange 25 and an outer flange 26 at the end of the panel 20. The width of the web 24 varies from top to bottom of the panel conforming, in some respects, to curvature of the outer body panel, though not so extreme, and being so proportioned that the flange 26 is spaced a considerable distance inwardly of the body line represented by the fender skirt. The front hinge or door pillar 27 is also a varying channel section having a web 28, an inner flange 29 and an outer flange 30. The forward parts of the flanges 29 and 30 overlap the flanges 25 and 26, respectively, of the cowl side panel 20, the inner flange 29 extending to the offset 23 and the outer flange 30 having its forward edge substantially aligned with the edge of the flange 26. The flanges of the pillar member are then welded or otherwise permanently secured to the flanges of the channel of the cowl panel 20 throughout this overlapping engagement, the depth of the flanges 29 and 30 and the overlap being so proportioned as to provide a closed box pillar section of substantial depth when the two channels are so secured together. The rocker panel 14 (see Figure 1) has an offset 35 spaced slightly rearwardly of the rear edge 13 of the fender and extends forwardly thence into overlapping relationship with the associated flanges 26 and 30 to which it is permanently secured. While the cowl side panel (and hence the flanges 25 and 26) terminates on the line 31, the flange 30 of the pillar channel bends through at least 90° of arc and is reinforced by the conforming front edge of the rocker panel 14, which extends above and below the line 31. The floor side sill 32 is basically a channel section having a vertical web 50, an upper flange 51 having a joggle 52 and a lower flange 53, the outer portion of which is bent to a depending flange 54. The floor panel 33 has a joggle 55 adjacent to the edge of its horizontal extent to receive the inner part of the flange 51 and a deep depending flange 56 permanently secured at its lower edge to the depending flange 54 of the side sill making a longitudinally extending box sill section. The floor panel 33 extends forwardly over the floor ledge 18 far enough to bring the flange 56 into overlapping engagement with the adjacent cowl side panel 20 to which it is permanently secured completing a dustproof seal between the floor panel and the front housing. The inner edge 57 of the rocker panel 14 overlies the upper flange 51 of the side sill 32 outwardly of the joggle 52. Thus, there are no free joints between the cowl structure, the door pillar, the running board, or the floor panel, permitting leakage from either the engine compartment or wheel enclosure.

The rear edge 13 of the fender 10 has an internally disposed overlapping flange 36 within which is permanently secured the outer leg 37 of the Z section 38 which has an inner leg 39 abutting the joined flanges 26 and 30 (and in the lower portion, the rocker panel 14 as well) and removably secured to them by a number of spaced bolts—one of which is shown at 40. Access to this connection may readily be had either from above by reaching rearwardly from the engine compartment or from beneath reaching upwardly within the fender skirt. The web of the Z section 38 varies in depth throughout, conforming to the exterior body line but leaving sufficient space between the legs 37 and 39 to permit access to the bolts 40 and the introduction of fender bumping anvils, in the event a bent fender is to be straightened without being removed from the vehicle. As shown in Figure 2, the web 28 of the pillar 27 has two or more depressions such as that shown at 41 in which is seated a strap hinge member 42 having its inner end bolted through the web 28 and reinforced by an angle 43 bolted to the outer flange 30 of the pillar at 44 and to the hinge member 42 at 45. As the axis of the hinge member 42 is spaced substantially inwardly of the line of the outer surface of the side panel and of the fender skirt 11, as a door hinged thereon opens, its forward edge would move inwardly behind the edge 13 of the fender into the space 46 defined between the outside face of the pillar 27, the web of the Z member 38 and its leg 37. As will be noted in the upper part of Figure 2, the pillar construction continues in the hollow box section 47 in conjunction with the upper part 48 of the cowl roof panel which serves as the windshield frame and extends further forming the roof as top panel of the vehicle. A filler member 58 carries the desired body line over the juncture between the cowl roof panel and the lower portion of the housing, the break 59 coinciding with the junction between the vehicle hood 8 and the top of the fender (which, in this construction, is the only side panel forwardly of the door). It will be understood that in Figure 2, the Z section 38 is shown detached from the fender 10. This is ordinarily permanently attached to the skirt, but is included in this view to indicate the attachment with the body members.

It will thus be seen that the cowl of the vehicle extends rearwardly as a substantially integral panel—at least as far as the outer edge of the pillar to which the door is attached. It is thus apparent that dust cannot leak inwardly of the door, since the enclosure is complete at least as far as the outer edge of the door. In addition, when the fender is properly attached to the outermost portion of the cowl extension, the joint there is substantially dustproof and there will be no leakage rearwardly from the wheel housings or the engine compartment within the area bounded by the exterior of the fender skirt. It is usually necessary, in order to provide for the door check, light switches and the like, to have several apertures in the rear face of the pillar. These have also been a source of dust leakage but in the present construction, by making each pillar a closed box section, the forward wall of the pillar represented by the web 24 may be entirely imperforate and whatever wiring or connections are required on the rear face of the pillar (represented by the web 28), so that there is no opportunity for leakage within the vehicle. The cowl not only extends integrally outwardly beyond the point of door attachment but in itself as an element of the pillar, and the particular construction shown is very effective in increasing the structural resistance of this member without the addition of extra stiffening means. The fender proper is secured internally to the body and while the securing means is readily available for installation or removal of the fender, there is no visible means of attachment—even when the door of the vehicle is open—and no elaborate precaution need be taken for waterproofing, antisqueak, or the like. The customary joints between the fenders and the body panel which have always been exposed to damage due to rust, are entirely avoided. Further, the fender itself, as a service unit may be made up complete with its attaching means, is represented by the Z section 38.

Certain changes may be made in the specific construction shown, but it is the intention to cover by the claims such changes as may reasonably be within the scope thereof.

The invention claimed is:

1. In an automotive body cowl construction, comprising, a rearwardly opening box structure in which the dashboard serves as the bottom and the cowl panels as two opposite sides and the toeboard and associated floor and cowl top panel as the other two opposite sides, said cowl panels being formed at their rear edges with an outwardly extending flange, a door pillar member associated with said flange, said flange extending at least to the outer surface of said pillar member to form a substantially continuous partition between said pillars, a fender having a depending skirt spaced substantially outwardly of said associated flange and pillar and the rear edge of said skirt defining the forward edge of a door opening, a transverse connecting member extending between said fender and said associated flange and pillar, a substantial distance and forwardly of the rear face of said pillar and of the rear edge of said fender, said depending skirt, associated flange and transverse connecting member forming a chamber adapted to receive the forward edge of a closure member, and a hinge secured at the rear of said pillar.

2. In an automotive body cowl construction, comprising, a rearwardly opening box structure in which the dashboard serves as the bottom and the cowl panels as two opposite sides and the toeboard and associated floor and the cowl top panel as the other two opposite sides, said cowl panels being formed at their rear edges with a substantially channel shaped flange extending outwardly a substantial distance therefrom, a door pillar member comprising a channel section, said pillar channel section and said cowl channel flange secured in partially nested position with the flanges of said pillar channel section overlying for a portion of their length the flanges of the said cowl panel channel flange and the webs of said pillar channel section and said cowl channel flange being in substantial parallelism and spaced to form a composite box section pillar, a fender having a depending skirt spaced substantially outwardly of said composite pillar, a mounting element for said fender comprising a transverse web permanently secured at its outer edge to said fender and having a flange at its inner edge overlying the outer associated flanges of said pillar channel section and said cowl panel channel flange, means detachably securing said mounting element to said pillar, the rear edge of said fender defining the forward edge of the door opening in said body and being spaced substantially rearwardly of the web of said mounting element to form a rearwardly opening chamber between the skirt of said fender and the outer surface of said pillar closed forwardly by the web of said mounting element.

3. In an automotive body cowl construction, comprising, a rearwardly opening box structure of which the dashboard serves as a bottom and the cowl panels as two opposite sides and the toeboard and associated floor and the cowl top panel as the other two opposite sides, said cowl panels being formed at their rear edge with an outwardly extending flange comprising a first channel section offset with respect to said cowl panel, a door pillar member comprising a second channel section, the outer end of the inner flange of said second channel section adapted to overlie said first channel in the offset formed in said cowl panel and the outer flange of said second channel overlying the outer flange of said first channel member, said overlying flanges being each permanently secured to each other to form a substantially weatherproof joint, said associated channels forming a composite hollow box section pillar, a fender having a depending skirt spaced substantially outwardly of said pillar, an attaching member for said fender comprising a substantially transverse web permanently secured at its outer edge to the inner surface of said fender skirt and having an inner flange overlying the associated outer flanges of said two channels, means detachably securing the flange of said attaching member to said associated flanges, the rear edge of said fender defining the forward edge of the door opening for said body, said edge being spaced substantially rearwardly of the web of said attaching member, hinge members secured to the rear face of said pillar inwardly of said fender skirt, there being a rearwardly opening chamber formed between the outer surface of said pillar and the inner surface of said fender skirt enclosed forwardly by the web of said attaching member, said web and first channel on each side and said cowl comprising a substantially weatherproof forward enclosure for said body extending between the opposite fenders.

4. The structure of claim 2 which is further characterized in that said detachable securing means traversing the associated flanges of said mounting element and said channels are disposed inwardly of the fender skirt and forwardly of the web of said mounting element.

5. The structure of claim 2, which is further characterized in that said cowl top panel is integral with and an extension of the roof of said body, said cowl panels being completely covered by the external body panels.

6. In an automotive body cowl construction, comprising, a rearwardly opening box structure in which the dashboard serves as the bottom and the cowl panels as two opposite sides and the toeboard and associated floor and cowl top panel as the other two opposite sides, said cowl panels being formed at their rear edges with an outwardly extending flange, a door pillar member associated with said flange, said flange extending at least to the outer surface of said pillar member to form a substantially continuous partition between said pillars, a fender having a depending skirt spaced substantially outwardly of said associated flange and pillar, a connecting member extending between said fender and said associated flange and pillar, said connecting member lying inwardly of said fender and forwardly of said pillar, said dashboard and toeboard and associated floor section being a stamping having outwardly extending marginal flanges secured to said cowl panels, the upper surface of said floor section being spaced a substantialy distance upwardly of the lower edge of said cowl panels and joining with the floor of said body, said body floor having depending flanges along the side edges thereof spaced inwardly of said pillars and extending forwardly to the respective cowl panels, a longitudinal channel member having a substantially vertical web abutting the inner face of the adjacent pillar, the top flange of said longitudinal channel member extending inwardly to said body floor and the lower flange thereof being secured to the adjacent depending flange of said body floor forming a longitudinally extending box section side structural member.

7. In an automotive body construction, a composite box section front door pillar, a fender panel spaced a substantial distance outwardly of said pillar and connected thereto by a transverse web, said pillar and said web together defining the rear wall of a front wheel housing, the rear edge of said fender defining the forward edge of a door opening, a longitudinal box section structural member extending rearwardly from the base of said pillar, a substantially channel shaped rocker panel having a web defining the outer surface of said body along the bottom thereof and flanges inwardly directed and secured to the top and bottom of said longitudinal structural member, the forward portion of said rocker panel being inset to receive the rear edge of said fender in continuation of the principal longitudinal line of said rocker panel, the forward edge of said rocker panel being secured to said pillar.

8. An automotive body construction, a substantially vertical box section door pillar, a fender member spaced outwardly of said pillar and secued thereto by a transverse web, said pillar and said web together forming the rear wall of a front wheelhousing, a longitudinal box section structural member extending rearwardly from said pillar, a rocker panel having a web defining the outer surface of said body along the bottom thereof and flanges inwardly directed and secured to the top and bottom of said longitudinal structural member, the rocker panel web being spaced substantially outwardly of the outer surface of said pillar, said pillar and transverse web and rear part of said fender forming a rearwardly opening chamber therebetween, a hinge extending into said chamber, said rocker member having a forward edge secured to said pillar and serving as a bottom closure for said chamber, the forward portion of said rocker panel being inset to receive the rear edge of said fender to provide a continuous longitudinal line between the main portion of said rocker panel and the abutting portion of said fender.

9. In an automotive body cowl construction comprising, a rearwardly opening box structure in which the dashboard serves as the bottom and the cowl panels as two opposite sides and the toeboard and associated floor and cowl top panels as the other two opposite sides, said cowl panels being formed at their rear edges with an outwardly extending flange, a door pillar member associated with said flange, said flange extending at least to the outer surface of said pillar member to form a substantially continuous partition between said pillars, a fender having a dependent skirt spaced substantially outwardly of said associated flange and pillar, a connecting member extending between said fender and said associated flange and pillar, and said connecting member lying inwardly of said fender and forwardly of said pillar, a longitudinal box section structural member extending rearwardly from said cowl structure formed in part from the floor panel of said body, a substantially channel shaped rocker panel having a web defining a portion of the outer surface of said body, its upper flange serving as the sill of the door opening and secured to the upper portion of said longitudinal structural member, its lower flange secured to the lower portion of said longitudinal structural member, the forward end of said rocker panel being inset behind said fender skirt and the forward edge of said rocker panel being secured to said associated flange and pillar.

CLARENCE F. KRAMER.
HERBERT F. CROMWELL.

REFERENCES CITED

The following references are of record in the file of this patent:

UNITED STATES PATENTS

| Number | Name | Date |
|---|---|---|
| 1,816,333 | Ledwinka | July 28, 1931 |
| 1,909,287 | Ledwinka | May 16, 1933 |
| 2,012,057 | Swallow | Aug. 20, 1935 |
| 2,092,542 | Widman | Sept. 7, 1937 |
| 2,113,075 | Breer et al. | Apr. 5, 1938 |
| 2,115,903 | Breer et al. | May 3, 1938 |
| 2,188,891 | Haltenberger | Jan. 30, 1940 |
| 2,248,319 | Waterhouse, Jr. | July 8, 1941 |
| 2,313,587 | Saurer | Mar. 9, 1943 |
| 2,383,428 | Ulrich | Aug. 21, 1945 |

FOREIGN PATENTS

| Number | Country | Date |
|---|---|---|
| 558,869 | Great Britain | Jan. 25, 1944 |